United States Patent [19] [11] 4,251,056
Maniglia [45] Feb. 17, 1981

[54] CREEP PREVENTING SAFETY DEVICE FOR HYDRAULIC JACKS, ESPECIALLY OF THE TYPE EMPLOYED FOR PARTIALLY OR ONE-SIDE RAISING ROAD VEHICLES

[75] Inventor: Carmelo Maniglia, Genova Sestri, Italy

[73] Assignee: Luciano Riganti, Cassano Magnago, Italy

[21] Appl. No.: 44,956

[22] Filed: Jun. 4, 1979

[51] Int. Cl.$^3$ .......... B60P 1/48
[52] U.S. Cl. .......... 254/8 B
[58] Field of Search .......... 254/8 R, 8 B, 2 R, 2 B, 254/124

[56] References Cited

U.S. PATENT DOCUMENTS

| | | | |
|---|---|---|---|
| 2,189,010 | 2/1940 | Lewis | 254/2 B |
| 2,998,224 | 8/1961 | Reisig | 254/8 R |
| 3,379,411 | 4/1968 | Vanderjagt | 254/8 B |

*Primary Examiner*—Robert C. Watson
*Attorney, Agent, or Firm*—Kirschstein, Kirschstein, Ottinger & Cobrin

[57] ABSTRACT

A creep preventing safety device for hydraulic jacks, especially of the type employed for partially or one-side raising road vehicles, but not limited thereto, and comprising a bearing frame having journalled thereto the lifting arm of a force applying cup and its related parallel translation linkage, between opposite side plates of the frame there being accommodated the power applying hydraulic unit proper, along with the primary actuating lever and the foot lever for controlling the force applying cup, which hydraulic unit has its piston and piston rod operatively connected to said lifting arm; the creep preventing device being provided with a ratchet mechanism intervening between said power applying hydraulic unit and the lifting arm and including means for controllably releasing said ratchet mechanism.

2 Claims, 12 Drawing Figures

CREEP PREVENTING SAFETY DEVICE FOR HYDRAULIC JACKS, ESPECIALLY OF THE TYPE EMPLOYED FOR PARTIALLY OR ONE-SIDE RAISING ROAD VEHICLES

BACKGROUND OF THE INVENTION

This invention relates to a creep preventing safety device for hydraulic jacks of the type employed for either partially or fully raising road vehicles, but not limited thereto.

Such hydraulically operated jacks comprise in general a strong bearing frame, which carries journalled thereto a lifting arm and a force applying cup positioning linkage, as well as a power lever or tiller and a foot lever for fast no-load elevation of the lift arm. The power lever and foot lever control and/or actuate the power applying hydraulic unit of the jack, which unit is usually mounted between two opposite side plates included in said bearing frame. The hydraulic unit, as is well known, comprises basically a hydraulic cylinder/-piston system which operates on a closed circuit differential pumping action principle, the cylinder body being pivoted to the frame, while the piston rod acts on the lifting arm, whereto it is similarly pivoted.

In most applications, and particularly when used for raising parts of a road vehicle, said bearing frame is installed on wheel pairs, one such pairs comprising two strong load bearing wheels, and the other pair comprising in general castor wheels.

In conventional hydraulic jacks of the general type described above, position retention of the lifting arm while loaded is entirely dependent on the detenting capacity of the hydraulic unit, thereby, when one is required to operate in completely safe conditions, the raised vehicle has to be propped up by means of fixed stands or supports.

SUMMARY OF THE INVENTION

This invention is directed to obviating the cited problem by providing for the incorporation, in a hydraulic jack or similar device, of an automatically set creep preventing mechanism, which is progressively loaded as the lifting arm is raised to lock the latter in position even after the fluid pressure which normally hold the arm up is released.

According to a first aspect of the invention, the creep preventing mechanism, which can be itself released by manual control, comprises a ratchet or tooth formation cut along a portion of the piston rod of the hydraulic ram unit, while the related engagement pawl is a guillotine detent having a tooth adapted for unidirectional cooperation with said ratchet, said guillotine detent being biased by a spring whereagainst a manual control lever is operable, said manual control lever being preferably remote controlled from the handle bar of the jack tiller through a Bowden cable type of control.

According to a second aspect or embodiment of the invention, a pawl anchored for rocking to one porion of the jack side plates progressively engages a corresponding ratchet formed on a lever journalled to the top or upper end of the force applying cup lifting lever, and the pawl tooth, also remoted controlled by means of a Bowden cable type of control, can be disengaged from said ratchet every time that the creep preventing mechanism is to be deactuated.

Moreover, in order to further simplify the creep preventing device of this invention, while ensuring in all cases maximum safety against any incidental lowering of the raised lifting arm, as in the event of failure or leakage in the hydraulic system, a third and a fourth embodiment of the invention are additionally proposed.

According to the third embodiment of the invention, this creep preventing safety device comprises a rectilinear ratchet, wherein the creep preventing pawl is biased by elastic means towards the rectilinear ratchet and is adapted to be disengaged therefrom through a suitable control means, said creep preventing pawl being journalled for rocking to the jack frame, and said ratchet being formed on the lifting arm, or viceversa, such as to cause the lifting arm to selflock mechanically at any raised position and allow it to come down only upon controllable release of said creep preventing pawl.

The creep preventing device of this invention may also be applied, as mentioned, to other apparata in the same class as the cited jacks, e.g. to small size, wheel mounted, hydraulic cranes for raising vehicles.

BRIEF DESCRIPTION OF THE DRAWINGS

These and other features of the invention, and the advantages to be derived therefrom, will become apparent from the following detailed description of a few preferred embodiments thereof, illustrated by way of example only in the accompanying drawings, where.

DESCRIPTION OF THE PREFERRED EMBODIMENTS

Figure 1:
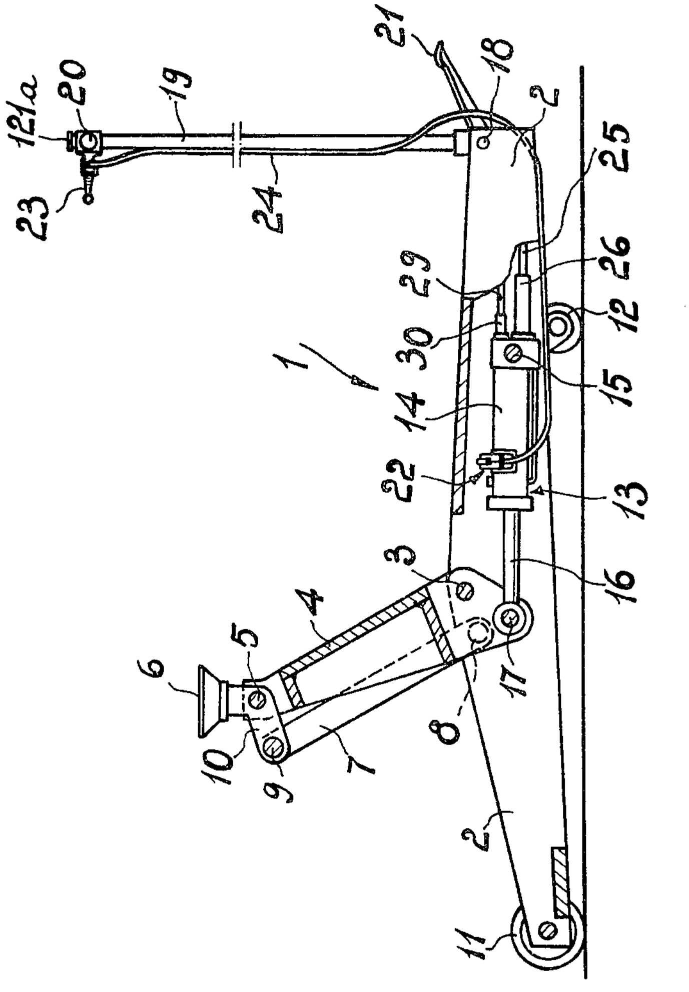
FIG. 1 is a side elevation view, partially cut away and sectional, of a wheel mounted hydraulic jack incorporating in its hydraulic power unit a creep preventing safety device, adapted for deactuation by a manually operated remote control, according to a first embodiment of the invention.
Figure 2:
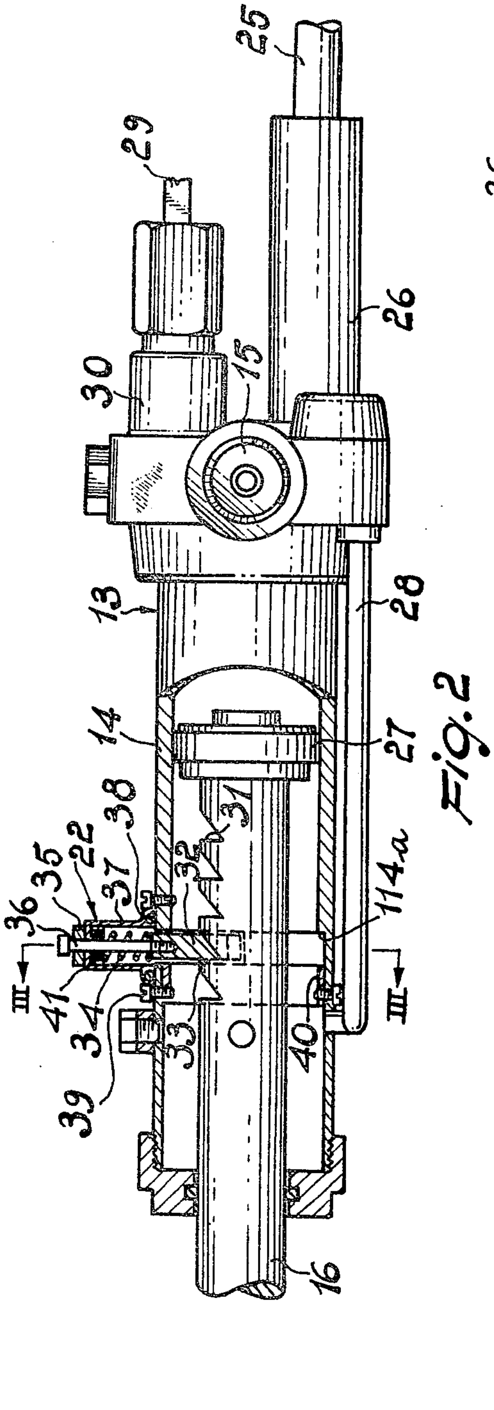
FIG. 2 is a view, similar to FIG. 1, showing in detail and to an enlarged scale, the creep preventing safety device, as associated with a detent ratchet cut along the piston rod of said hydraulic power unit.
Figure 3:
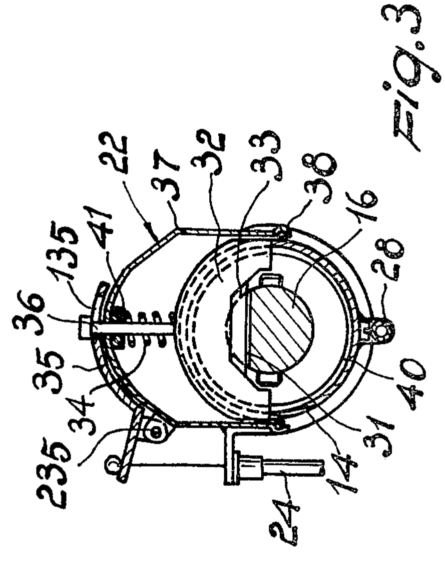
FIG. 3 is a cross-sectional view taken along the line III—III of FIG. 2.
Figure 4:
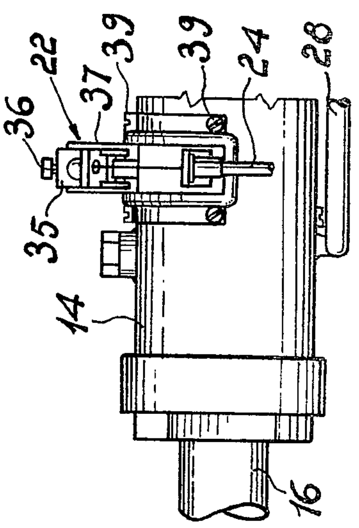
FIG. 4 is a side elevational view of said creep preventing device, as viewed from the outside in the same direction as FIG. 2.

In the drawing figures, similar or equivalent parts are denoted by the same reference numerals.

Reference will be first made to FIGS. 1-4 which illustrate the first embodiment of the invention as applied to a hydraulic jack.

The hydraulic jack is indicated at 1 and comprises a strong metal frame with side plates 2 which carries a lifting arm 4 journalled at 3. At the top or upper end of the lifting arm, there is swivel mounted at 5 a force applying cup 6. A pair of levers 7, which are pivoted at 8 to the side plates and at 9 to an embossment 10 of the stem of the cup 6, form an articulated parallelogram together with the arm 4, such as to keep the cup itself at all times parallel to itself regardless of the inclination of the lifting arm 4. The wheel system for the jack includes a pair of load bearing wheels 11 and a pair of castor wheels 12.

Between the side plates 2, there is accommodated the hydraulic power unit 13. More specifically, this unit comprises a cylinder 14, which is pivotally connected through pins 15 to the opposed side plates 2 of the bearing frame of the hydraulic jack 1. The rod 16 of the power piston 27 which reciprocates in said cylinder is journalled or pivotally connected at 17 to the lifting arm 4. Between the side plates 2, there is also journalled, at 18, the main actuating lever 19, or tiller, which is provided with a handle bar 20 for manual actuation of the unit 13 while lifting a load, a foot lever 21 being provided for fast lifting under no-load. A knob 121*a*, located on the handle bar 20 of the tiller, acts on a control rod 29 of the release valve 30 for lowering the arm 4.

In the embodiment described with reference to FIGS. 1 to 4, the instant creep preventing safety device 22 is applied to the cylinder 14 of the hydraulic unit 13, and its related release control 23 is mounted to the handle bar 20 to transmit control impulses to the device through a Bowden cable 24.

As is well known in the art, the tiller 19 acts on the stem 25 (FIG. 2) of a plunger 26 which acts in turn on the power piston 27 of the pump 14, in a closed circuit comprising a return line 28.

In this first embodiment of the invention, the creep preventing mechanism 22 comprises a ratchet or tooth formation 31 cut along a portion of the rod 16 of the power piston 27 which raises the arm 4 of the jack. The detent pawl, which cooperates with the ratchet 31, includes a guillotine type of detent 32 having a notch 33 cut therein, which is contoured similarly to a hinged catch. The guillotine 32 is biased by a compression coil spring 34 against which is active a control lever 35, remote controlled through the control 23 on the handle bar of the tiller 19 via the Bowden cable 24. A rod 36 formed with a head penetrates the guillotine 32 and is movable within a slot 135 in the lever 35, thus transmitting to the guillotine itself the control impulse received by the lever. The whole assembly is enclosed and guided in a box 37, which is set astride the body of the cylinder 14 by means of seals 38 and fastening screws 39. These screws also secure inside the cylinder 14 an abutment ring nut 40 intended for guiding the gate-like movement of the guillotine 32, in cooperation with a confronting annular offset 114*a* formed inside the cylinder 14. A further seal 41 completes the sealing system at the bore for the rod 36. As is apparent from the detail view of FIG. 3, the lever 35 is pivoted at 235 to the box-like enclosure 37.

The operation of the creep preventing safety device described above will be now briefly discussed. As the rod 16 of the power piston of the hydraulic unit is extended out of the unit, the tooth 33 moves stepwise along the ratchet 31, while the latter moves below the guillotine 32. It will be appreciated that at each step advance of the tooth, any regress motion of the rod 16 is prevented, even if the hydraulic lock is missing for a reason whatever. The lowering of the arm 4 of the jack will only be allowed by disengagement of the guillotine 32 from the ratchet 31, as controllably determined by raising the lever 35 through the manual control and Bowden cable 24.

It should be noted that the guillotine pawl 32 abuts against the thinner side of the cylinder body, namely against the side which is reinforced by the ring nut 40, as it enters the recess between teeth of the ratchet 31. Moreover, said safety mechanism comprising the guillotine pawl 32 is arranged at the rear of the cylinder 14, i.e. at the portion thereof which acts as the oil reservoir and where there is a virtually zero pressure condition.

Figure 5:
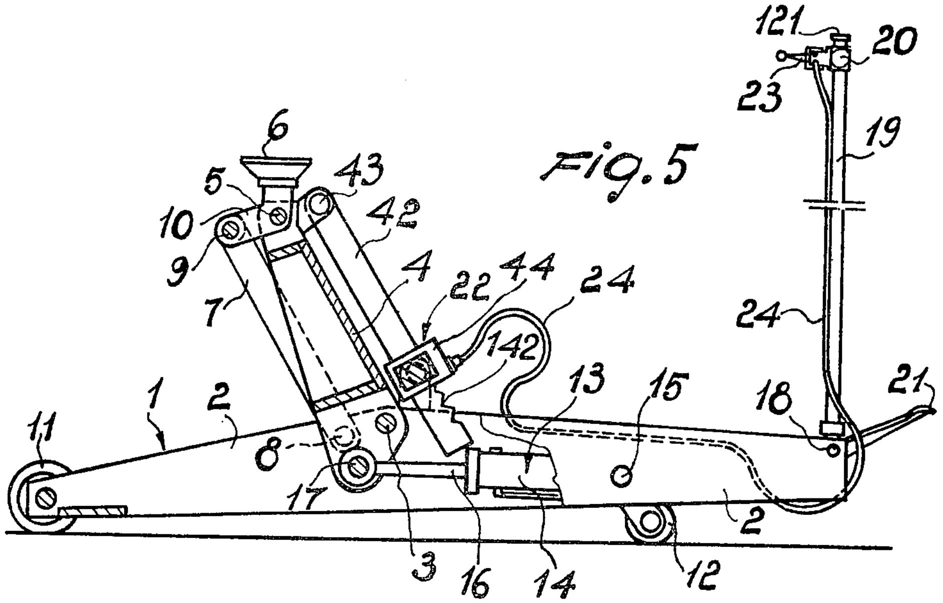
FIG. 5 is a view, similar to FIG. 1, showing a second embodiment of this invention, wherein the creep preventing safety device is associated with a rod arranged to rock or oscillate together with the lifting arm of the jack.
Figure 6:
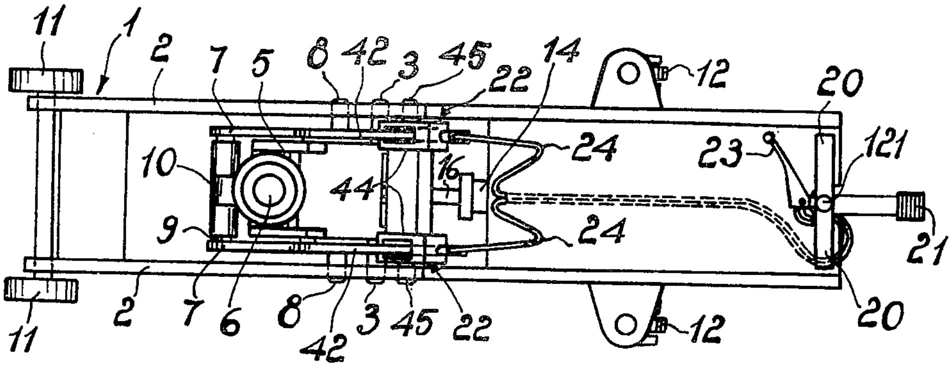
FIG. 6 is a top plan view corresponding to the view of FIG. 5.
Figure 7:
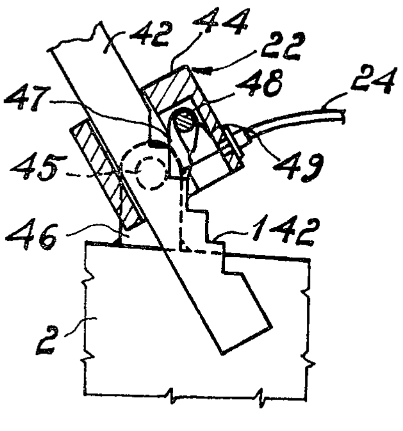
FIG. 7 is a detail view, to an enlarged scale, of the creep preventing safety device as incorporated in the manner shown in the second embodiment of FIGS. 5 and 6.

In the second embodiment of the invention, as illustrated in FIGS. 5 to 7 of the accompanying drawings, the creep preventing safety device 22 is associated with a ratchet or tooth formation 142 formed along one side of a tension lever 42, pivoted at 43 to the lifting arm 4 of the force applying cup 6.

In fact, two such tension levers 42 are provided, respectively on either sides of the lifting arm 4, as is visible in the plan view of FIG. 6, thereby there will be two identical creep preventing devices 22, one for each lever 42. Obviously, these devices will operate in parallel, thereby only one of them will be described in detail hereinafter.

As can be better seen in the detail view of FIG. 7, the creep preventing safety device 22 comprises now a strongly constructed box 44, which is journalled at 45 to a bracket 46 on the corresponding side plate 2 of the jack bearing frame. The toothed portion of the tension lever 42 slides through a corresponding window in the box 44 and the teeth 142 thereof are progressively engaged by a movable detent 47, pivoted to the box at 48 and biased towards the tooth formation by a spring 49. The spring 49, as is apparent from the figure, acts in opposition to the link of the respective Bowden cable 24, thereby the latter, as it is actuated through the remote control 23, is caused to release the ratchet or tooth formation such that the lifting arm is no longer locked in position, regardless of the oil pressure present in the hydraulic unit of the jack.

Figure 8:
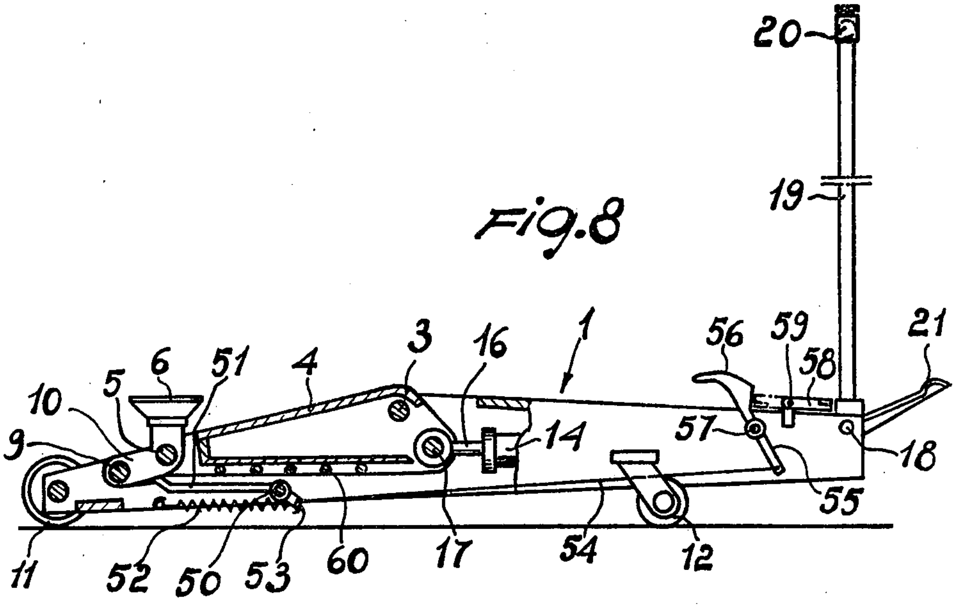
FIGS. 8 and 9 are elevational views, partly sectional, of a wheel mounted hydraulic jack for vehicles shown in its lowered position (FIG. 8) and raised position (FIG. 9), according to a third embodiment of the invention.
Figure 9:
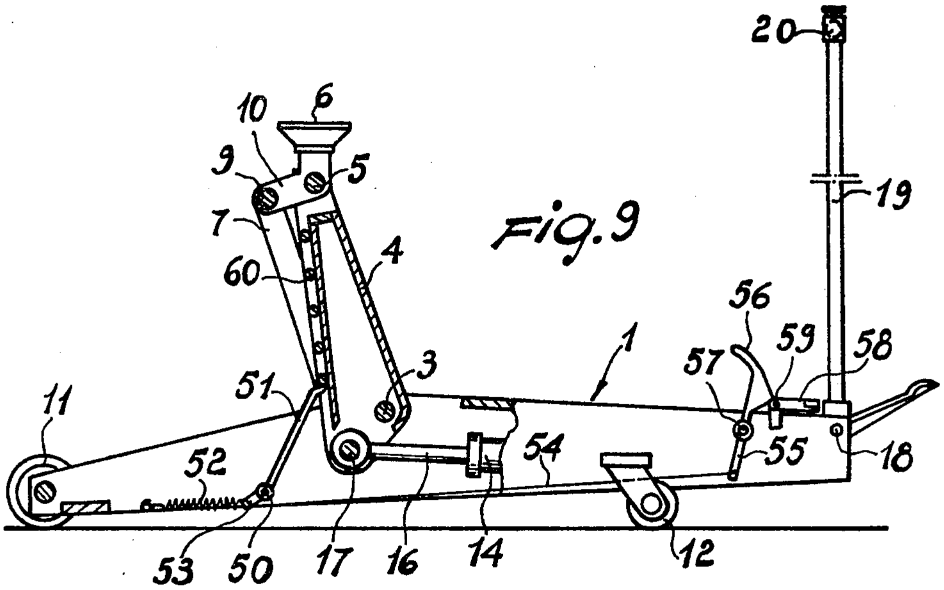

According to a third embodiment shown in FIGS. 8 and 9, between the two side plates 2 of the frame, there is journalled, or pivotally connected, at 50 a creep preventing pawl 51, wherewith is associated a tension spring 52 connected to a lug 53 of the pawl 51 itself. To this lug 53 of the creep preventing pawl 51, there is further secured a cable 54 which connects to the arm 55 of a foot lever 56 pivoted at 57 to the outside of one side plate of the frame. With this foot lever 56, there is associated a locking lever 58 which is pivoted at 59 to the jack frame.

The creep preventing pawl 51 cooperates with a ratchet or tooth formation 60 provided on the lower side of the lifting arm 4. The ratchet 60 may be implemented in any suitable manner, i.e. it may be in the form of a toothed bar having saw or other teeth, or in the form of a peg rack, namely comprise either flat or round iron sections which are attached, e.g. welded, to the lifting arm 4 crosswise to the same, as shown in FIGS. 8 and 9.

As the lifting arm 4 is raised, i.e. moved angularly upwards about its pivot 3, the creep preventing pawl 51 is held engaged with the rack 60 by the action of the spring 52, and by jumping over the teeth or pegs of the rack 60, follows the upward movement of the lifting arm 4 to prevent the latter from creeping downward from any given position. In order to bring the lifting arm down again, the creep preventing pawl 51 is disengaged from the rack 60 and tilted back to its lying rest position of FIG. 8 against the bias of the spring 52. For this purpose, the foot lever 56 is depressed to tilt rearwardly and downwardly the creep preventing pawl 51 via the cable 54.

It should be noted that in the lowered rest position of the lifting arm 4, the arm 4 and the underlying creep preventing pawl 51 are accommodated between the side plates of the main frame, as is apparent from FIG. 8. The lifting arm 4 may also be raised without its movement being followed up by the creep preventing pawl 51, and accordingly without mechanically lock therefor in the raised position. To this aim, the locking lever 58 is tilted from the unlocked position shown in FIG. 9, and in full lines also in FIG. 8, to a locked position shown in dot-and-dash lines in FIG. 8. In this locked position, the lever 58 hinders any angular movement of the foot lever 56, and this locks in turn the creep preventing pawl 51 in its inoperative lowered position shown in FIG. 8.

Figure 10:
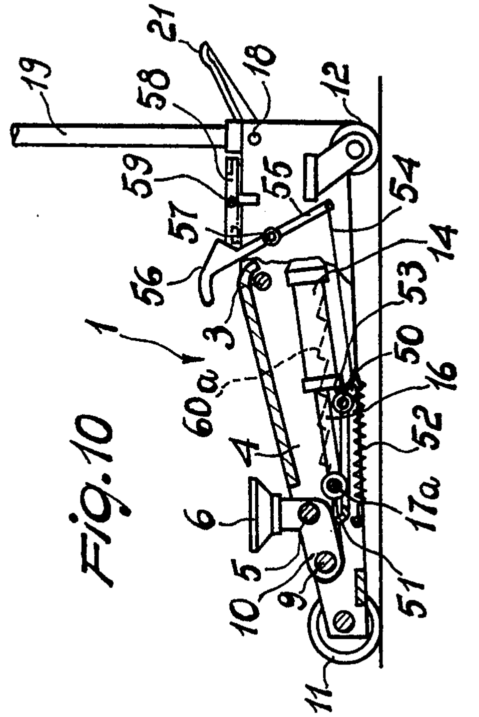
FIGS. 10 and 11 illustrate a fourth embodiment of the invention, the wheel mounted hydraulic jack for vehicles being represented in its lowered and raised positions respectively.
Figure 11:
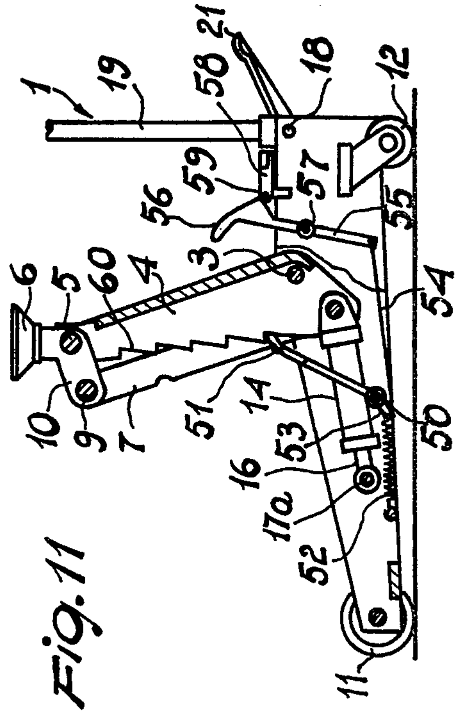

The hydraulic jack or raising mechanism for road vehicles illustrated in FIGS. 10 and 11, is basically similar to the one shown in FIGS. 8 and 9, similar or equivalent parts being denotes therein with the same reference numerals. The main difference between the two, is that in the wheeled jack of FIGS. 8 and 9, the lifting arm 4 lies, in its lowered rest position, on the side of its pivot 3 opposite the hydraulic cylinder, whereas in the embodiment of the wheeled jack shown in FIGS. 10 and 11, the lifting arm 4 and hydraulic cylinder 14 are arranged on the same side of the pivot 3. Furthermore, the hydraulic cylinder 14 is articulated at 17 to the lifting arm 4, while the rod 16 of the piston of said hydraulic cylinder 14 is articulated at *17a* to the wheeled frame. Consequently, in the embodiment of FIGS. 8 and 9, the creep preventing pawl 51 may be of plate-like configuration, i.e. comprise a simple strip or flat iron section, because it does not interfere with the hydraulic cylinder 14. In the example of FIGS. 10 and 11, by contrast, a creep preventing pawl of this type would interfere with the cylinder 14. Therefore, in this case, the creep preventing pawl 51 comprises a bracket which is pivoted with its two arms at 50 to the side plates of the wheeled frame, while its crossmember cooperates with the rack 60 rigid with the lifting arm 4. The arms of this creep preventing pawl 51 of bracket configuration, may be located externally along the sides of the frame, or the entire bracket-like pawl 51 may be accommodated between the sides of the frame.

In FIGS. 10 and 11, there is illustrated another embodiment of the ratchet *60a* rigid with the lifting arm 4. In the latter case, in fact, said ratchet *60a* comprises sawteeth cut in the edges of the two side members of the lifting arm 4.

The operation of the creep preventing safety device for hydraulic jacks and the like wheel mounted apparata, according to FIGS. 10 and 11, will be apparent from these figures, and is substantially the same as described with reference to the creep preventing safety device equipping the wheeled hydraulic jack of FIGS. 8 and 9. In both cases, the return movement of the raised lifting arm of the hydraulic jack is locked automatically and mechanically by the creep preventing pawl 51, thus avoiding any incidental drop of the lifting arm and load applied thereto, in the event of failures or leakage or erroneous handling of the hydraulic unit.

Figure 12:
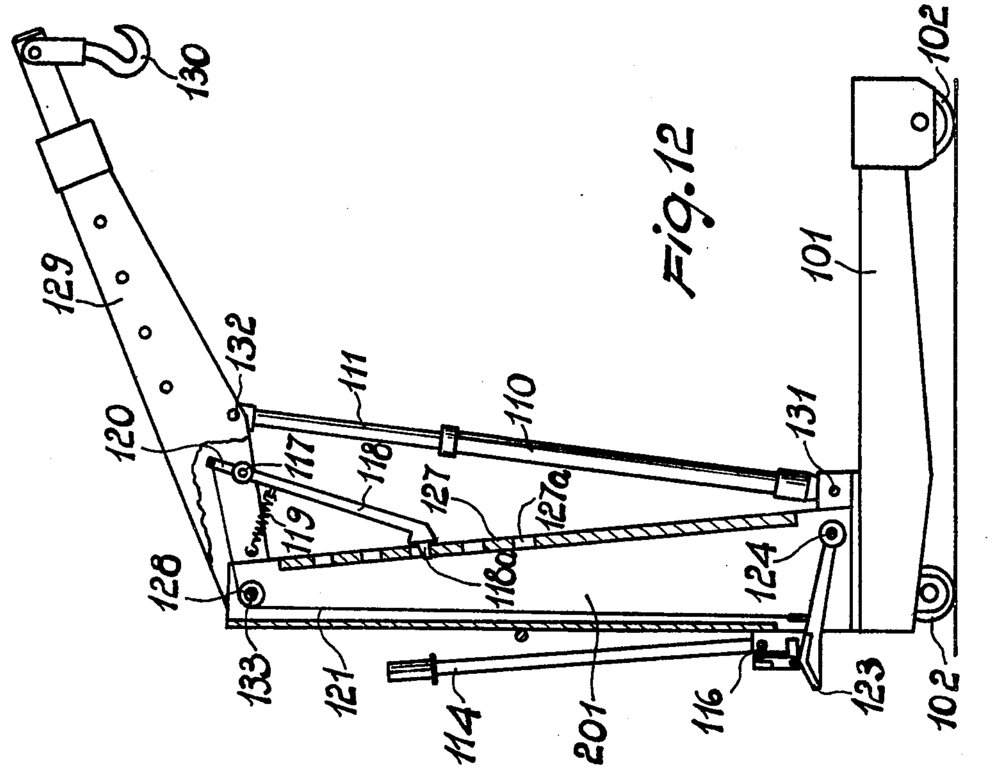
FIG. 12 shows in elevation, with parts in section, a small wheel mounted hydraulic crane for road vehicles.

FIG. 12 illustrates the application of the creep preventing safety device of this invention to a small wheeled crane for road vehicle raising. This crane comprises a wheeled base frame 101 having wheels 102 and an upright 201. To the upper or top end of the upright 201, there is articulated at 128 a telescoping boom 129 with lift hook 130. Between the frame 101 and boom 129, there is provided a hydraulic cylinder 110 which is articulated at 131 to said frame 101 in the proximity of the base or foot of the upright 201, while the rod 111 of its piston is articulated at 132 to the boom 129. The rocking lever 114 for actuating the pump of the hydraulic unit is pivoted at 116.

The safety device comprises a creep preventing pawl 118 having a detent tooth *118a*. Said pawl 118 is pivoted at 117 to the lifting arm 129 of the crane and cooperates, with its tooth *118a*, with the hollows or recesses *127a* of a rach 127 provided on the upright. This rack 127 may be composed of pegs, as in FIGS. 8 and 9, or include sawteeth, as shown in FIGS. 10 and 11, or comprise a row of holes or slots formed through the front wall of the upright 201, as shown in FIG. 12. The creep preventing pawl 118 is held in engagement with the rack 127 by the action of a spring 119, and can be disengaged from the rack 127 by means of a foot lever 123 which is articulated at 124 to the base of the upright 201 and connected through a cable 121 to a lug 120 on the creep preventing pawl 118. The cable 121 is passed around a leading pulley 133.

The operation of this latter embodiment relating to a wheeled crane for raising vehicles, which may be likened function-wise to a wheel mounted jack according to the preceding embodiment, but arranged to act in a vertical direction, is entirely similar to that of the cited jacks.

In the various embodiments discussed hereinabove, there is provided, therefore, a device, which may be likened to a ratchet and pawl gear, which device is interposed between the hydraulic power unit and the lifting arm, and is associated with control means for deactuating it, said control means being effective to permit the lifting arm to be lowered under load as the oil pressure is removed from the hydraulic unit.

A particular advantage of the solution proposed herein resides in that the instant creep preventing device takes automatically its operative position, or lifting arm locking position, during the raising movement of the lifting arm in the hydraulic jack or the like apparatus.

From the various embodiments of the invention described hereinabove, it will be appreciated that the invention characteristically improves on conventional hydraulic jacks, and particularly, though not exclusively, on those employed for partial or full raise of road vehicles, since it provides therein a creep preventing device which is automatically loaded and deactuated or released by manual control, the device affording full protection against any danger of the jack collapsing under load, in that the holding power does not depend essentially on the pressure present in the hydraulic unit and the hydraulic lock it provides.

Understandably, the invention is not limited to the embodiments described and illustrated herein by way of example, and may be largely varied and modified, especially construction-wise, to suit individual applicational requirements, without departing from the broadest scope of the instant inventive concept, as described in the foregoing and claimed in the appended claims.

I claim:

1. A hydraulic lifting jack for vehicles, said jack comprising:

(A) a frame, (B) a lifting arm (4), (C) means pivotally mounting said arm on the frame, (D) said arm being adapted to bear a load on its free end, (E) hydraulic means (14,16) for raising and lowering said lifting arm, and (F) a safety device comprising (i) a rack (60) on the lifting arm, (ii) a pawl-type supporting member (51), (iii) means pivotally mounting said member on the frame for pivotal movement to and from a supporting position in which the free end of said supporting member engages said rack in the raised position thereof and prevents lowering of the same, (iv) a spring (52) urging said supporting member into engagement with said rack, (v) a cable (54) for disengaging said supporting member from the rack against the action of said spring, (vi) an actuating lever (56) swingably mounted on said frame and connected to said cable to operate said cable for disengaging said supporting member from said rack, (vii) a locking lever (59) swingably mounted on said frame, (viii) said actuating lever cooperating with said locking lever to selectively bring said locking lever (a) from a position in which it permits said actuating lever to assume a position corresponding to engagement of said supporting member with said rack (b) to a position in which said locking lever locks said actuating lever in a position corresponding to disengagement of said supporting member from said rack of said lifting arm.

2. A hydraulic lifting jack according to claim 1 in which said rack provided on said lifting arm constitutes a plurality of small metallic bars parallel to one another and secured by welding to said lifting arm.

* * * * *